(12) United States Patent
Marsacq et al.

(10) Patent No.: US 7,521,147 B2
(45) Date of Patent: Apr. 21, 2009

(54) FUEL CELL COMPRISING CURRENT COLLECTORS INTEGRATED IN THE ELECTRODE-MEMBRANE-ELECTRODE STACK

(75) Inventors: Didier Marsacq, Grenoble (FR); Jean-Yves Laurent, Claix (FR); Christel Roux, Saint-Quentin-sur-Isere (FR); Christine Nayoze, Fontaine (FR); Françis Cardot, Nauchatel (CH)

(73) Assignee: Commissariat a l'Energie Atomique, Paris (FR)

( * ) Notice: Subject to any disclaimer, the term of this patent is extended or adjusted under 35 U.S.C. 154(b) by 371 days.

(21) Appl. No.: 10/559,933

(22) PCT Filed: Jun. 21, 2004

(86) PCT No.: PCT/FR2004/001548

§ 371 (c)(1), (2), (4) Date: Dec. 28, 2005

(87) PCT Pub. No.: WO2005/015669

PCT Pub. Date: Feb. 17, 2005

(65) Prior Publication Data

US 2006/0134500 A1 Jun. 22, 2006

(30) Foreign Application Priority Data

Jul. 1, 2003 (FR) .................................. 03 07967

(51) Int. Cl.
*H01M 4/86* (2006.01)
*H01M 8/02* (2006.01)

(52) U.S. Cl. .......................................... 429/44; 429/38
(58) Field of Classification Search .................. 429/38, 429/39, 44
See application file for complete search history.

(56) References Cited

U.S. PATENT DOCUMENTS

| 2002/0122972 A1 | 9/2002 | Klitsner et al. |
| 2003/0021890 A1 * | 1/2003 | Marsacq et al. ............. 427/115 |

FOREIGN PATENT DOCUMENTS

| EP | 0 817 297 A2 | 1/1998 |
| EP | 1 009 048 A1 | 6/2000 |
| EP | 1 282 185 A2 | 2/2003 |
| EP | 1 434 297 A2 | 6/2004 |

OTHER PUBLICATIONS

Kevin G. Stanley et al.; "Fabrication of a Micromachined Direct Methanol Fuel Cell"; IEEE Canadian Conference on Electrical and Computer Engineering; CCECE 2002; Winnipeg, Manitoba, Canada, May 12-15, 2002; Canadian Conference on Electrical and Computer Engineering; New York, NY; IEEE; US; pp. 450-454; XP002271656; ISBN: 0-7803-7514-9.

* cited by examiner

*Primary Examiner*—Stephen J. Kalafut
(74) *Attorney, Agent, or Firm*—Oliff & Berridge, Plc.

(57) ABSTRACT

The invention relates to a fuel cell with a stack comprising an electrolytic membrane (4), with front and rear faces (4a, 4b) on which first and second current collectors (13, 15) are respectively arranged, each comprising a metallic deposit and provided with a number of transverse passages. First and second electrodes (14, 16) are respectively arranged on the first and second current collectors (13, 15) such as to come into direct contact with the electrolytic membrane (4).

6 Claims, 4 Drawing Sheets

FUEL CELL COMPRISING CURRENT COLLECTORS INTEGRATED IN THE ELECTRODE-MEMBRANE-ELECTRODE STACK

BACKGROUND OF THE INVENTION

The invention relates to a fuel cell comprising:
a stack comprising a first electrode, an electrolytic membrane provided with front and rear faces and a second electrode,
and first and second current collectors integrated in the stack and corresponding respectively to the first and second electrodes, each current collector comprising a metallic deposit and being provided with a plurality of transverse passages for passage of a fluid.

STATE OF THE ART

Fuel cells, of the proton exchange membrane (for example PEMFC or Proton Exchange Membrane Fuel Cell) or $OH^-$ anion membrane fuel cell type, generally comprise a large number of elemental cells arranged in series and each comprising a stack comprising an anode and a cathode separated by an electrolytic membrane. The stack is arranged between two current collecting plates and it is generally called an EME (Electrode-Membrane-Electrode) type stack. The set of elemental cells forms an assembly of the press filter type.

As represented in FIG. 1, an elemental cell 1 comprises an anode 2, a cathode 3 and an electrolytic membrane 4 arranged between the two electrodes. In the case of a PEMFC, the anode 2 is the seat of a reaction the reactive agent whereof is hydrogen whereas a reaction between the $H^+$ protons formed at the anode 2 and oxygen takes place at the cathode 3 to form water. The electrolytic membrane 4 is designed to let the $H^+$ protons pass from the anode 2 to the cathode 3.

The anode 2 and cathode 3 are respectively supplied with hydrogen and oxygen via circulation channels 5a and 5b connected to reagent sources which can be, on the one hand, pure hydrogen or hydrocarbons reformed or not for the hydrogen source and, on the other hand, pure oxygen or air for the oxygen source. The circulation channels 5a and 5b are respectively delineated by the external face of the anode and of the cathode and by the internal wall of plates 6a and 6b designed to collect the current. The plates 6a and 6b are generally bipolar plates clamping the EME stack.

Each of the electrodes is formed by a diffusion layer 2a and 3a and a catalytic layer 2b and 3b. Thus, each diffusion layer 2a or 3a enables fluids, i.e. oxygen, hydrogen and water, to pass between a circulation channel 5a or 5b and the catalytic layer 2b or 3b of the corresponding electrode. The electrochemical reactions take place at the level of the catalytic layers of the anode and cathode.

The use of current collecting plates 6a and 6b is indispensable for satisfactory operation of the fuel cell. However the current collecting plates may significantly impair the accessible mass and volume energy density of the cell. In addition, such an assembly is bulky and its volume can not be easily reduced. However, in certain applications such as those intended to supply energy to portable equipment, the fuel cells must be of small size while at the same time preserving their performances.

Patent application EP-A2-1,282,185 therefore proposes to provide a fuel cell of cylindrical geometry from a substrate at least one component whereof is designed to be eliminated and acting as support for the successive depositions of a first current collector, a stack comprising a first electrode, an electrolytic membrane and a second electrode and a second current collector. The first and second electrodes each comprise a diffusion layer and a catalyzer whereas the first and second current collectors may be in the form of a mesh of metallic fabric. Production of such a fuel cell is however not very practical to implement.

OBJECT OF THE INVENTION

It is an object of the invention to provide a fuel cell remedying the shortcomings of the prior art and having, in particular, increased energy densities, while at the same time being able to easily supply at least one of the electrode-membrane-electrode stack components with fluid. More particularly, it is a further object of the invention to provide a fuel cell of small dimensions that is able to be miniaturized, using in particular microtechnology fabrication techniques.

According to the invention, this object is achieved by the fact that the first and second current collectors are respectively arranged on the front and rear faces of the electrolytic membrane, between the electrolytic membrane and the corresponding electrode.

According to a first development of the invention, the first and second current collectors are both structured in the form of a grid.

According to a second development of the invention, the first and second current collectors are both structured in the form of a comb.

According to a third development of the invention, the first and second current collectors are porous, the transverse passages being formed by the pores of the current collectors.

According to a preferred embodiment, the first and second current collectors each comprise an alternation of porous zones and non-porous zones, the transverse passages being formed by the pores of the porous zones.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

The teaching of Patent application EP-A2-1,282,185 could be applied to fuel cells having a non-cylindrical geometry, for example a fuel cell comprising an Electrode-Membrane-Electrode stack, noted as EME stack and formed by plane layers.

Figure 1:
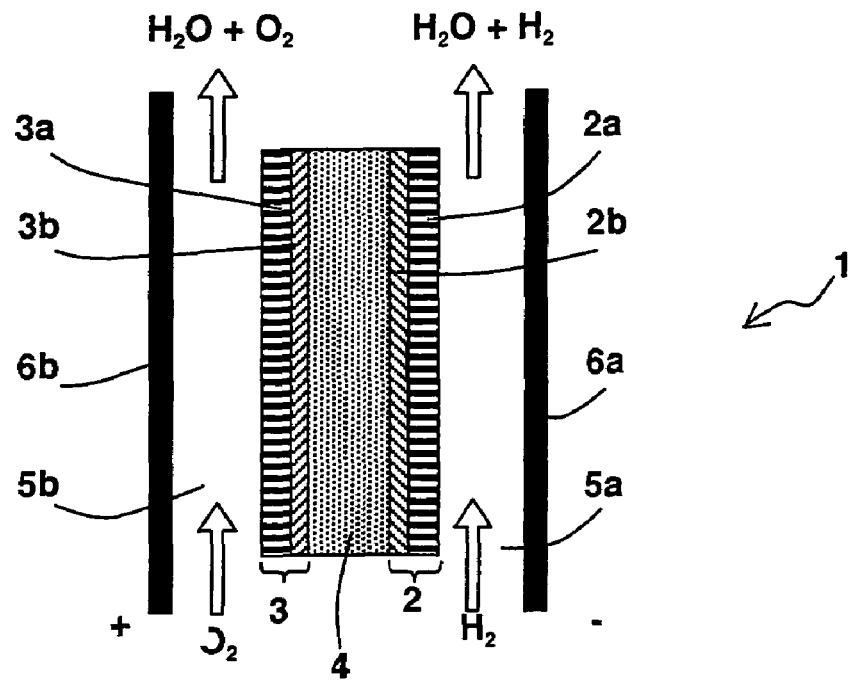
FIG. 1 is a schematic representation, in cross-section, of an elemental cell of a fuel cell according to the prior art.
Figure 2:
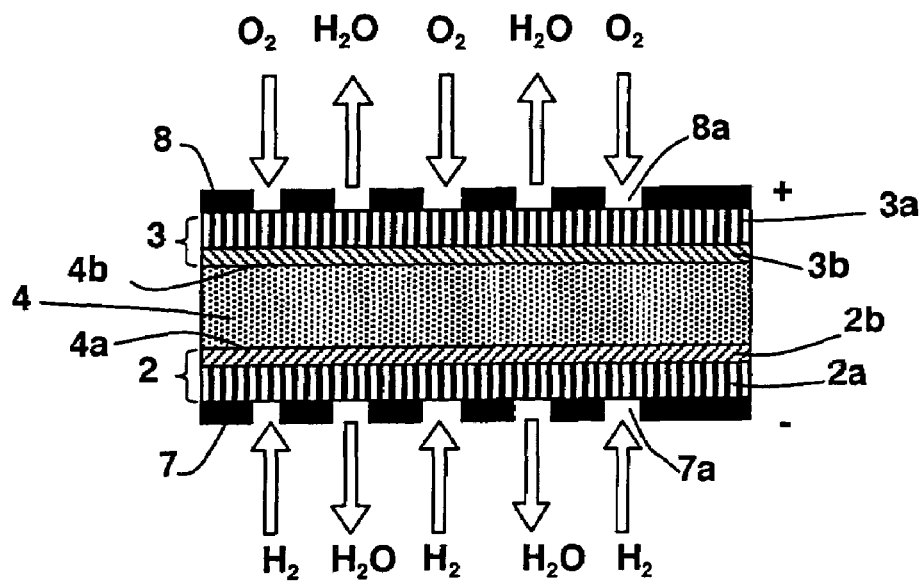
FIG. 2 is a schematic representation, in cross-section, of a particular embodiment of a fuel cell.
Figure 3:
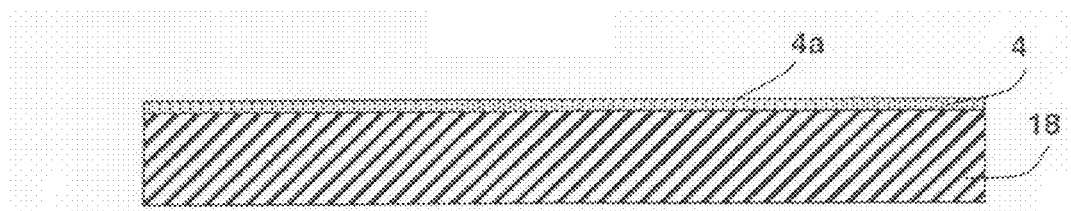
FIGS. 3 to 10 illustrate different steps of production of a fuel cell according to the invention.

Thus, as represented in FIG. 2, a fuel cell can comprise an EME stack formed by plane layers. The stack thus comprises an electrolytic membrane 4 provided with front and rear faces 4a and 4b whereon there are respectively arranged first and second catalytic layers 2b and 3b, respectively covered by a diffusion layer 2a and 3a. The first catalytic layer 2b and the first diffusion layer 2a form the anode 2 whereas the second catalytic layer 3b and the second diffusion layer 3a form the cathode 3.

First and second current collectors 7 and 8 are integrated in the EME stack, that is to say that the EME stack and the first and second current collectors 7 and 8 form a single integrated assembly. In FIG. 2, the first and second current collectors 7 and 8 are respectively arranged on the external faces of the first and second diffusion layers 2a and 3a of the anode 2 and cathode 3. They are each formed by a metallic deposit comprising a plurality of transverse passages 7a and 8a designed to enable a fluid to pass to a diffusion layer. Thus, hydrogen can pass through the transverse passages 7a of the anodic current collector 7 to reach the diffusion layer 2a of the anode 2 and oxygen passes through the transverse passages 8a of the cathodic current collector 8 to reach the diffusion layer 3a of the cathode 3. Likewise, the water produced in the course of operation of the fuel cell is removed via the same transverse passages 7a and 8a.

This type of integrated structure enables the electrons formed during the electrochemical reactions taking place at the level of the catalytic layers to be collected, while enhancing diffusion of the reactive fluids or of the fluids formed, without any provision of external energy such as the use of a fan for example. Due to the number and distribution of the transverse passages, the fluid can penetrate over the whole surface of the diffusion layer and therefore react over a large surface of the catalytic layer. This in particular enables the efficiency of the electrochemical reaction to be improved.

Moreover, integrating the current collectors on the stack enables the electrons formed when hydrogen reduction takes place to be made to circulate over a very short distance between a current collector and the catalytic layer of the corresponding electrode. As the distance covered by the electrons is about a few micrometers, it prevents ohmic losses due to the level of electrical conductivity of the materials constituting the electrodes when the latter are not compressed by a press filter type device. The electrical conductivity of the electrodes is generally in the 1 S/cm to 10 S/cm range.

However, such an integration of the current collectors may cause an impairment of the electrodes and therefore reduce the performances of the fuel cell. Thus, according to the invention, this drawback is overcome by the fact that the first and second current collectors comprising a metallic deposition and provided with transverse passages are respectively arranged on the front and rear faces of the electrolytic membrane, between the electrolytic membrane and the corresponding electrode. The current collectors are preferably formed by a metal chosen from the noble metals and the metal is more particularly gold or platinum in the case of an acid fuel cell and nickel in the case of an alkaline fuel cell. Moreover, the catalytic elements of the electrodes remain in direct contact with the electrolytic membrane of the stack via the transverse passages formed in the current collectors.

Figure 4:
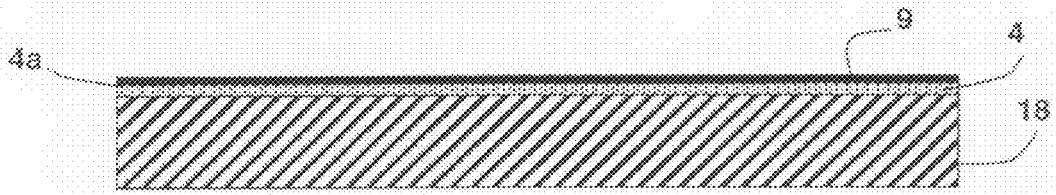

According to a particular method for production of a fuel cell, as represented in FIGS. 3 to 10, an electrolytic membrane 4 is deposited on a substrate 18 (FIG. 3) in the form of a perfluorinated polymer layer of Nafion® type. A metallic layer 9, preferably made of gold, chromium-gold alloy or titanium-gold alloy, is then deposited on the front face 4a of the electrolytic membrane 4 by evaporation (FIG. 4).

Figure 5:
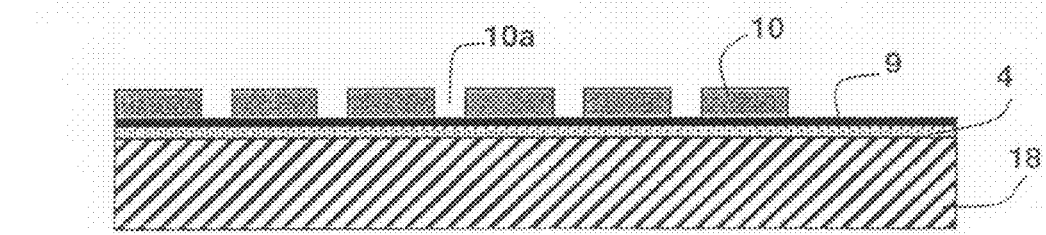
Figure 6:
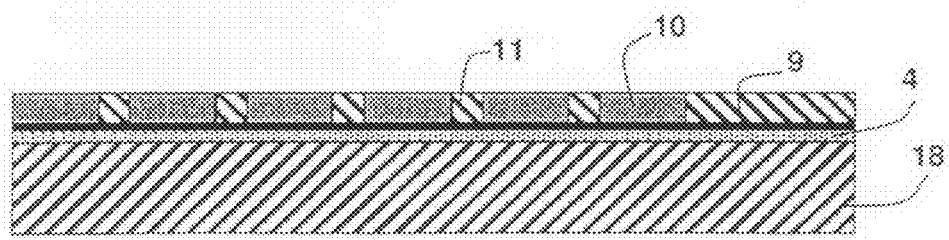
Figure 7:
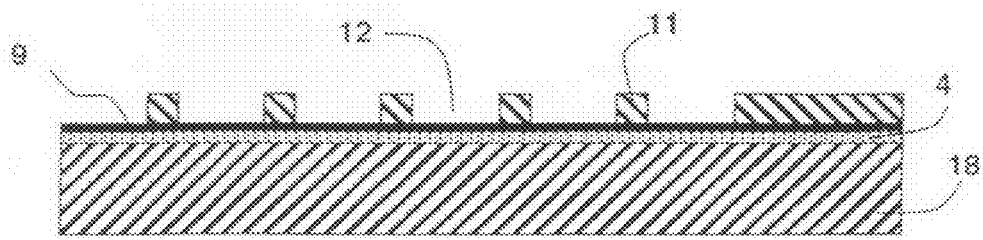
Figure 8:
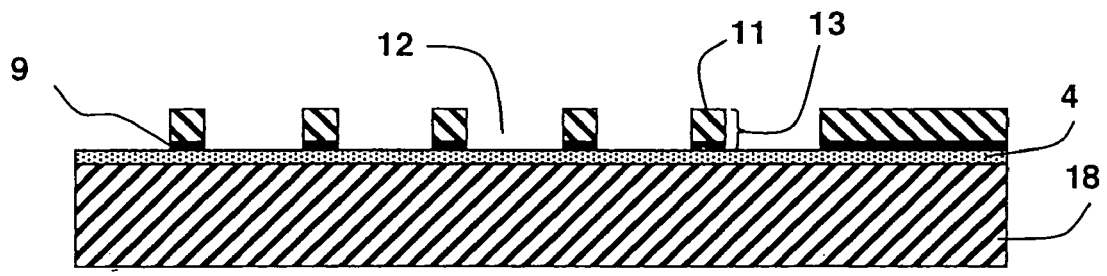
Figure 9:
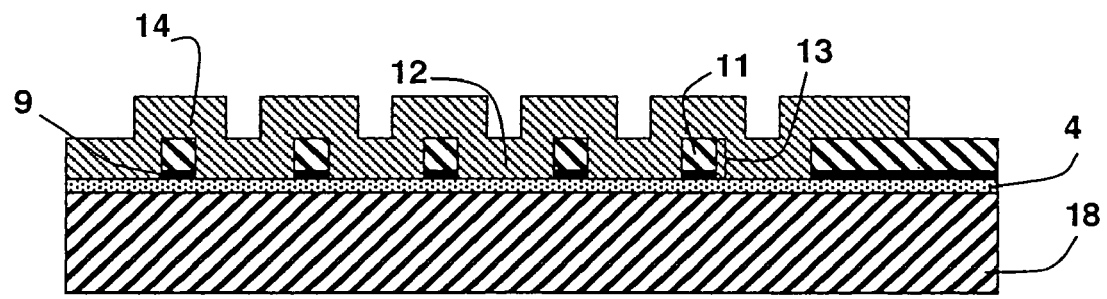

Then a photolithography step is performed so as to form a mask 10 made of material able to be cross-linked on the metallic layer (FIG. 5). The mask 10 comprises cavities 10a wherein a galvanic deposit is made, for example of gold or copper (FIG. 6). The galvanic deposit thus comprises raised parts 11 corresponding to the complementary part of the cavities 10a. Once the material able to be cross-linked has been removed (FIG. 7), the metallic layer 9 is etched (FIG. 8) so that it comprises transverse passages 12 designed to allow the protons to pass from the anode to the electrolytic membrane 4 or from the electrolytic membrane 4 to the cathode.

The raised parts 11 of the galvanic deposit are thus respectively superposed on the edges of the transverse passages 12 of the metallic layer 9 and the assembly forms a first current collector 13. A catalytic element 14 forming a first electrode is then deposited in the form of a thin film on the surface of the assembly formed by the electrolytic membrane 4 and the first current collector 13. It then fills the transverse passages 12 of the first current collector 13 so as to be in direct contact with the electrolytic membrane 4 via the transverse passages. It moreover covers the raised parts 11. The assembly then forms a fuel half-cell.

Figure 10:
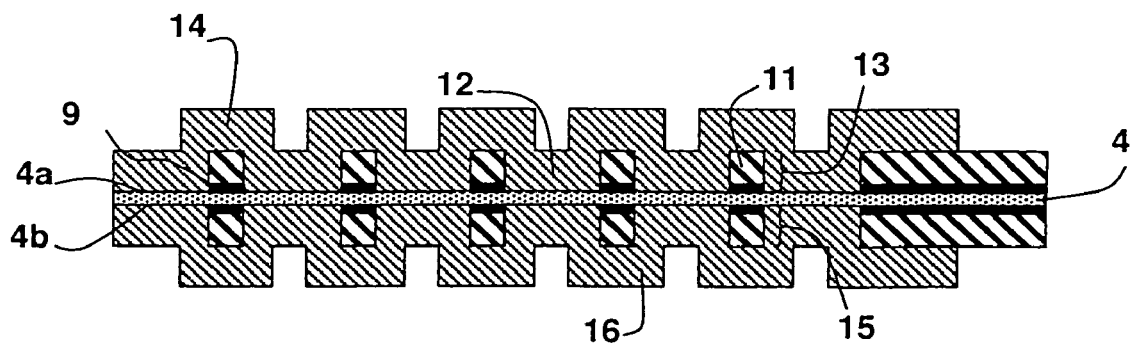

The rest of the fuel cell is then formed by removing the substrate 18 so as to free the rear face of the electrolytic membrane. The assembly formed by the electrolytic membrane 4, the first collector 13 and the first electrode 14 is then turned, after it has been covered by a protective layer if this is the case is Then, as illustrated in FIG. 10, a second current collector 15 and a second electrode 16 are formed on the rear face 4b of the electrolytic membrane 4, in identical manner to the first current collector 13 and the first electrode 14. The catalytic element of the second electrode 16 then fills the transverse passages formed in the second current collector 15 so as to be in direct contact with the rear face 4b of the electrolytic membrane 4, and it covers the second current collector 15.

Integrating current collectors in an EME stack enables, in particular, deposition techniques known in the microtechnology field to be used, and therefore enables miniature fuel cells to be produced and more quickly. Moreover, a fuel cell comprising current collectors provided with transverse passages and arranged on the front and rear faces of the electrolytic membrane presents equivalent intrinsic electrochemical characteristics to those of press filter type cells. It does however have a much higher volume or mass energy density and it is much less bulky.

Producing the electrodes on the current collectors also simplifies the method for producing such a fuel cell. Indeed, arranging the electrodes on the current collectors is advantageous for fabrication of the fuel cell for, as the catalytic element of the electrodes is more fragile than the current collector, it is easier to deposit the fragile elements on the more solid elements than the opposite. This also enables a more rugged fuel cell to be obtained, the thickness of the catalytic elements no longer being limited by the current collectors.

Figure 11:
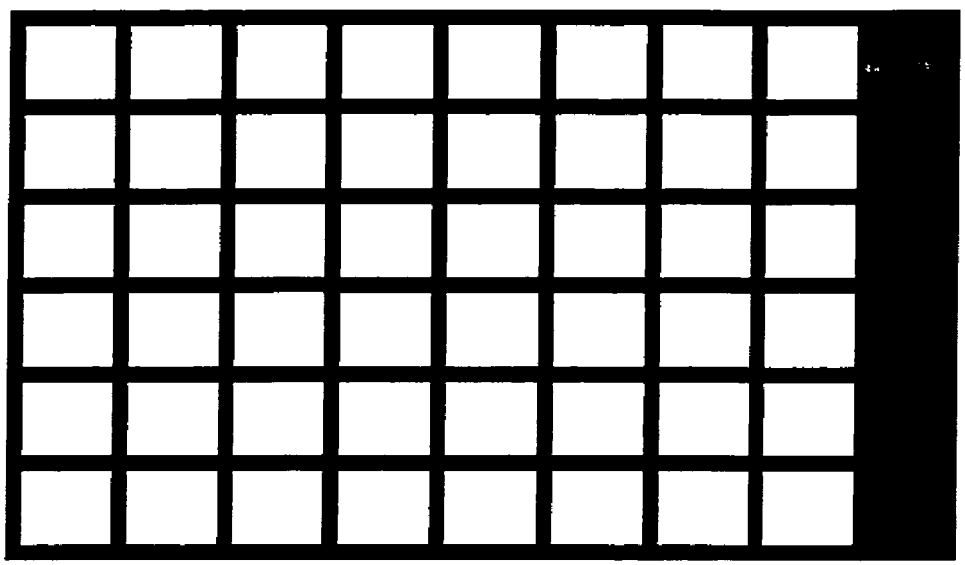
FIGS. 11 and 12 represent, in top view, first and second embodiments of a current conductor of a fuel cell according to the invention.
Figure 12:
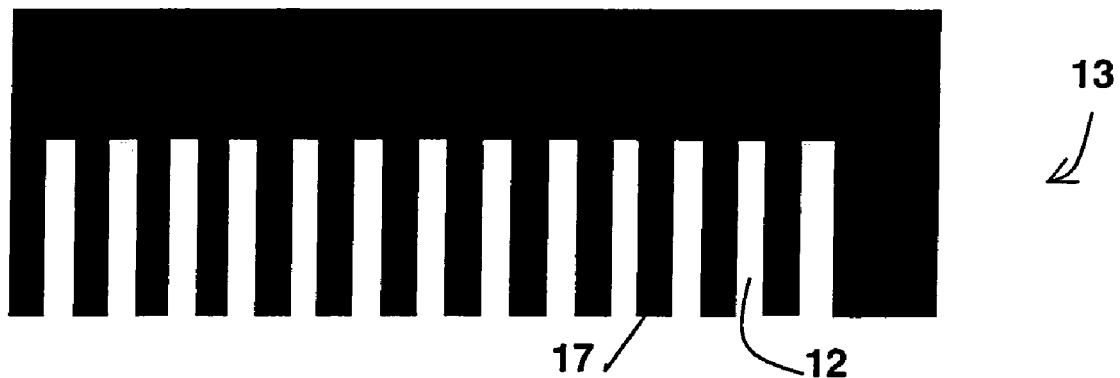

The invention is not limited to a particular embodiment. Thus, the fuel cell can comprise a plurality of EME stacks with integrated current collectors. The fuel cell can be of any shape, for example cylindrical. The current collectors can also be of any shape, with transverse passages of the current collectors arranged in such a way as to ensure continuity of current flow in the current collectors. Thus, as represented in FIGS. 11 and 12, the current collectors can be structured in the form of a grid (FIG. 11) or in the form of a comb (FIG. 12). For example, in the case of a current collector 13 in the form of a comb, the transverse passages 12 are formed between the branches 17 of the comb. In addition, the number and distribution of the transverse passages enable a high reaction surface to be preserved between the catalytic element and the electrolytic membrane.

The current collector are produced by any type of known methods to achieve thin films. They can in particular be achieved by Physical Vapour Deposition (PVD), by Chemical Vapour Deposition (CVD), by lithography or by electrochemical deposition. The current collectors can also be uniformly porous or they can comprise an alternation of porous zones and non-porous zones, the pores, in both cases, playing the role of the transverse passages of the current collectors.

The invention claimed is

1. A fuel cell, comprising:
an electrolytic membrane layer provided with a front face and a rear face;
a first metallic current collector layer having a plurality of transverse passages, the first current collector layer arranged on and in direct contact with the front face of the electrolytic membrane;
a first electrode layer comprising a catalytic element deposited over the first current collector layer and the front face of the electrolytic membrane, wherein the first electrode layer:
fills in the transverse passages of the first current collector layer and is in direct contact with the electrolytic membrane through the transverse passages, and
covers the first current collector layer so that the first current collector layer is between the front face of the electrolytic membrane and the first electrode layer;
a second metallic current collector layer having a plurality of transverse passages, the second current collector layer arranged on and in direct contact with the rear face of the electrolytic membrane; and
a second electrode layer comprising a catalytic element deposited over the second current collector layer and the rear face of the electrolytic membrane, wherein the second electrode layer:
fills in the transverse passages of the second current collector layer and is in direct contact with the electrolytic membrane through the transverse passages, and
covers the second current collector layer so that the second current collector layer is between the rear face of the electrolytic membrane and the second electrode layer.

2. The fuel cell according to claim 1, wherein the first and second current collectors are both structured in the form of a grid.

3. The fuel cell according to claim 1, wherein the first and second current collectors are both structured in the form of a comb.

4. The fuel cell according to claim 1, wherein the first and second current collectors are porous, the transverse passages being formed by the pores of the current collectors.

5. The fuel cell according to claim 1, wherein the first and second current collectors each comprises an alternation of porous zones and non-porous zones, the transverse passages being formed by the pores of the porous zones.

6. The fuel cell according to claim 1, wherein the metal of the first and second current collectors is chosen from noble metals.

* * * * *